Oct. 10, 1967 W. W. CARSON, JR 3,346,229

VEHICLE MIRROR ASSEMBLY

Filed June 17, 1964

INVENTOR.
WILLIAM WALLER CARSON, JR.
BY
ANDRUS & STARKE
ATTORNEYS.

3,346,229
VEHICLE MIRROR ASSEMBLY
William Waller Carson, Jr., Wauwatosa, Wis., assignor to Velvac, Inc., Milwaukee, Wis., a corporation of Wisconsin
Filed June 17, 1964, Ser. No. 375,806
9 Claims. (Cl. 248—477)

ABSTRACT OF THE DISCLOSURE

The invention relates to a mirror assembly including mirror which is mounted between the legs of a generally U-shaped frame. The end of each leg of the frame is connected through a plastic clutch assembly to an arm having a concave socket-like portion. The socket-like portion of each arm is positioned in mating engagement with a convex spherical portion of a mounting bracket attached to the vehicle to thereby adjustably mount the mirror assembly on the vehicle.

The plastic clutch assembly includes a pair of identical, flexible clutch elements with each element having a series of circumferentially arranged teeth. The clutch elements are secured together in a manner to prevent relative axial movement and yet the flexible nature of the plastic material permits one element to be rotated with respect to the other to change the angularity of the mirror with respect to the mounting brackets.

---

This invention relates to a mirror assembly and more particularly to a rear view mirror assembly for a truck or a commercial vehicle.

The typical rear view mirror assembly used with a truck or commercial vehicle includes a mirror carried by a frame which is attached to brackets mounted on the cab of the truck. It is desirable to have the mirror readily adjustable so that the driver can easily position it at the desired reflective angle. In addition, it is sometimes necessary for the driver to pivot the mirror frame inwardly to a position alongside the cab where clearance is at a minimum.

In the conventional mirror assembly, the mirror frame and the mounting brackets on the truck cab are connected through frictional members, such as fiber discs, which are secured together by bolts. The frictional engagement of the fiber discs prevents free movement of the mirror frame, yet permits the frame to be pivoted manually. In practice, after repeated adjustments of the mirror frame, the frictional connection will loosen to the point where wind pressure at higher speeds will move the frame and mirror. When this situation occurs, it is necessary to turn down the connecting bolts, with care being exercised to turn the bolts down only to a degree such that the mirror frame can still be manually pivoted.

The present invention is directed to a mirror assembly for a truck or other vehicle in which the mirror can be readily moved to vary its angularity, and yet is positively locked which prevents the mirror from moving by wind pressure and prevents loosening by virtue of repeated adjustment. In addition, the mirror assembly is completely versatile and the mirror frame can be mounted on all types of cabs or vehicle bodies without alteration or adjustment of the frame.

More specifically, the mirror assembly includes a mirror which is rigidly mounted between the legs of a generally U-shaped frame. The end of each leg of the frame is connected through a plastic clutch member to an arm having a concave, socket-like portion. The socket-like portion of each arm is positioned in mating engagement with a convex, spherical portion of a mounting bracket, and the socket and spherical portions are secured together by suitable bolts. The complementary engagement of the socket and spherical portion provides universal adjustment for the mirror frame so that the mirror assembly can be readily adapted to all cabs and vehicle bodies.

The plastic clutch member serves to lock the frame and mirror at any one of a number of positions and is formed of two identical clutch plates or elements, with each element having a series of circumferentially arranged, mating teeth. The mating engagement of the clutch teeth serves to positively lock the mirror frame, and yet, the flexible nature of the plastic material permits the frame to be moved relative to the mounting brackets.

Other objects and advantages will appear in the course of the following description.

The drawings illustrate the best mode presently contemplated of carrying out the invention.

Figure 1:
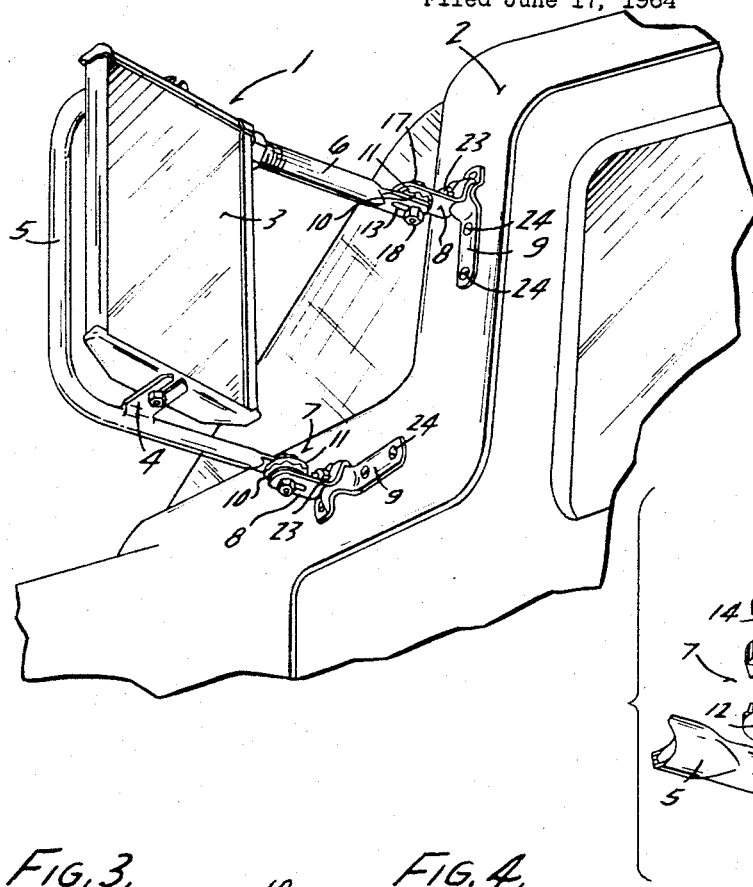
FIG. 1 is a fragmentary perspective view of the mirror assembly as mounted on the cab of a truck.
Figure 2:
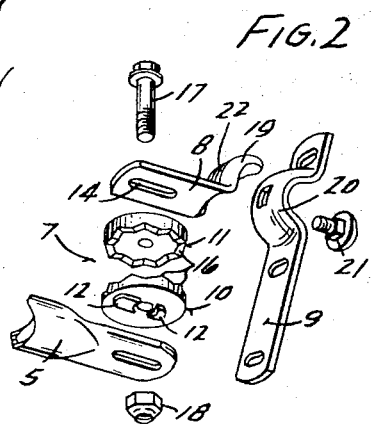
FIG. 2 is a perspective exploded view showing the structure utilized in attaching the mirror frame to the cab of the truck.

The drawings illustrate a rear view mirror assembly 1 attached to the cab 2 of a truck or commercial vehicle. The mirror assembly 1 includes a conventional mirror 3 which is secured through lugs 4 to the generally horizontal legs of a U-shaped frame 5. The upper leg of the frame 5 is adjustably connected to an extension 6 which extends inwardly to a position over the door of the truck cab.

The inner end of the lower leg of frame 5, as well as the inner end of frame extension 6, is connected by a clutch member 7 to an arm 8, and each arm 8 is attached to a mounting bracket 9 secured to the cab of the truck. Each of the clutch members 7 include a pair of identical clutch plates 10 and 11. The outer surface of each clutch plate 10 is provided with an elongated ridge 12 which is received within complementary slots 13 in frame 5 and extension 6. Similarly, clutch plates 11 are provided with ridges 12 which are received within slots 14 in arms 8. Each ridge 12 has a generally elongated shape extending eccentrically from the center of the respective clutch plate toward the periphery, and the engagement with the slots 13 and 14 prevents the clutch plate from rotating with respect to the supporting member.

Figure 4:
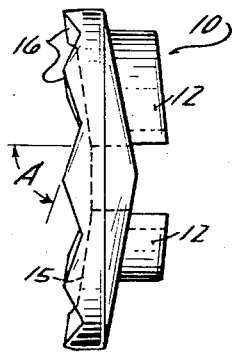
FIG. 4 is a side elevation of the clutch element.
Figure 5:
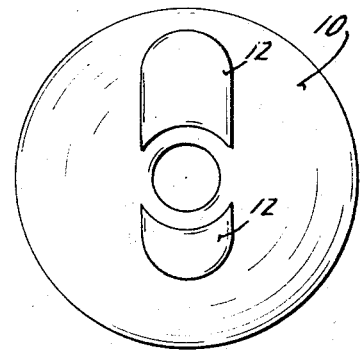
FIG. 5 is a plan view of the outer surface of the clutch element.
Figure 6:
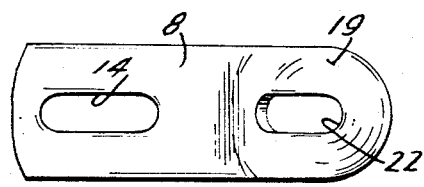
FIG. 6 is an enlarged fragmentary plan view of the mounting arm.

The inner surface 15 or face of each clutch plate 10 and 11 is generally concave, and as shown in FIG. 4, extends radially inward at an angle of about 10° with respect to a plane normal to the axis of the clutch plate.

Figure 3:
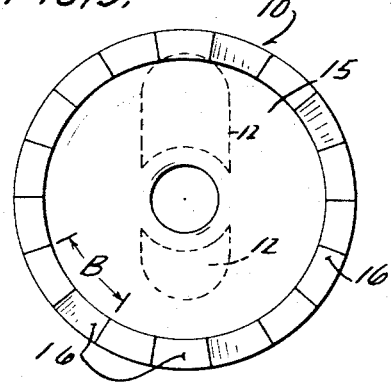
FIG. 3 is a plan view of the inner surface of a clutch element.

The outer periphery of surface 15 of each clutch plate is provided with a series of circumferentially arranged teeth 16 or ridges. As best shown in FIG. 4, the teeth have a relatively shallow pressure angle A in the range of 10° to 45°, with the particular angle determined by the number of teeth and the depth of the teeth to achieve the desired locking force. The circumferential pitch between the teeth, as shown by B in FIG. 3, determines the number of positions at which the frames 5 and 3 can be locked.

It is preferred that each clutch plate have an odd number of teeth 16. With an odd number of teeth, it is possible to get 180° displacement of one clutch plate from the other, while this relationship is not possible if the clutch plates have an even number of teeth.

The clutch plates 10 and 11 are firmly held together by screws 17 which extend through slots 13 and 14, as well as through axial openings in the clutch plates. A stop nut 18 is threadedly engaged with the end of the screw 17. Screws 17 prevent relative axial movement of plates 10 and 11.

The clutch plates 10 and 11 are formed of a rigid, yet flexible material. It has been found that acetal resins, such as Delrin, sold by E. I. du Pont de Nemours & Company, Inc., is a particularly satisfactory material for use as the clutch plates 10 and 11. This resin has a tensile strength at 73° F. of about 10,000 p.s.i., an elongation at 73° F. in the range of 15 to 75%, a flexural modulus of elasticity at 73° F. of 410,000, a flexural strength at 73° F. of 14,100, and a hardness of Rockwell 120.

The molecular structure of the acetal resin polymer is that of a linear acetal consisting of unbranched polyoxymethylene chains which are of great length, normally averaging more than 1000 $CH_2O$ units.

When it is desired to adjust the angularity of the mirror 3, the frame is pivoted which will cause the clutch plates 10 attached to frame 5 and extension 6, to rotate with respect to the fixed clutch plate 11. As clutch plates 10 are rotated, the teeth 16 of clutch plates 10 move out of meshing engagement with the teeth of clutch plates 11 and ride up the inclined surface of the teeth of clutch plates 11 to the high point of the teeth. As the clutch plates are held together with a positive force through the screw 17, the clutch plates 10 and 11 deform or flex to accommodate this rotation. On further rotation, the teeth of clutch plates 10 ride down the inclined surfaces of teeth 16 of clutch plates 11, and the deformed condition of the clutch plates provides a spring-like action which forces the teeth 16 of the clutch plates into meshing engagement. Thus, no auxiliary spring mechanism is required to urge the teeth into meshing engagement. The axis of the clutch member 7 associated with the lower leg of frame 5 is not in alignment with the axis of the clutch member 7 associated with the upper extension 6, so that the torque on the clutch members is different as the frame 5 is pivoted. Nevertheless, the plastic material will deform sufficiently to permit both of the clutch plates 10 to rotate with respect to the corresponding clutch plates 11.

The meshing engagement of the teeth 16 on the clutch plates provides a positive lock which will prevent the mirror and frame from pivoting or twisting due to wind pressure or vibration and also prevents loosening of the connection after repeated adjustments of the mirror. The number of teeth 16 in the clutch plates determine the number of positions at which the frame 5 and mirror 3 can be locked, and this can be varied as desired.

As an additional feature, a universal mounting mechanism is employed so that the mirror assembly 1 can be readily attached to all types of cabs 2 or vehicle bodies. In this regard, each arm 8 is provided with a generally concave socket-like portion 19 which has a curvature of a portion of a sphere. The concave portion 19 is adapted to be in contiguous or mating engagement with a convex ball-like portion 20 on mounting bracket 9. The convex portion 20 also has the curvature of a portion of a sphere, and the socket-like portion 19 can be rotated universally with respect to the ball-like portion 20. The complementing portions 19 and 20 are secured together by a bolt 21 which extends through an opening in convex portion 20 and through a slot 22 in concave portion 19. A nut 23 is threaded onto the outer end of the bolt 21.

The socket-like portion 19 has a smaller radius of curvature than ball-like portion 20, and this results in portion 19 being deformed slightly when the bolts 21 are turned down so that a circular line contact is achieved between portions 19 and 20 which prevents a sloppy or loose fit.

The mounting bracket 9 is secured to the cab 2 by a series of screws 24.

With the ball-and-socket type of connection between arms 8 and mounting bracket 9, the mirror assembly can be readily mounted on any cab or vehicle body without alteration or adjustment of the frame or mounting brackets. This not only simplifies the mounting procedure, but eliminates the need for various types of mounting brackets or adapters which were formerly necessary in order to adapt a mirror assembly to the various shapes and configurations of vehicle cabs and bodies.

While the mirror assembly of the invention is particularly adaptable for use with a truck or other commercial vehicle, it is contemplated that the mirror can also be used for automobiles, boats, elevators, industrial buildings, and the like.

Various modes of carrying out the invention are contemplated as being within the scope of the following claims particularly pointing out and distinctly claiming the subject matter which is regarded as the invention.

I claim:

1. An apparatus of the class described, comprising a first movable member, a second fixed member, clutch means interconnecting the movable member and the fixed member, said clutch means including a pair of clutch members with one of said clutch members being fixed to the movable member and the other of said clutch members being fixed to said fixed member, said clutch members having meshing circumferentially arranged teeth capable of being flexed as said movable member is moved with respect to said fixed member, and means for securing the clutch members together and preventing relative axial movement therebetween.

2. A mirror assembly, comprising a frame, a mirror mounted on the frame, a connecting member adapted to be attached to an object, clutch means interconnecting the frame and the connecting member, said clutch means including a pair of clutch members with one of said clutch members being fixed to the frame and the other of the clutch members being fixed to the connecting member, said clutch members having meshing teeth capable of being deformed as one of said clutch members is rotated with respect to the other of said clutch members, and means for positively securing the clutch members with said teeth in meshing engagement and preventing axial movement between the clutch members.

3. A mirror assembly, comprising a frame, a mirror mounted on the frame, connecting means for connecting the frame to an outside object, clutch means interconnecting the frame and said connecting means, said clutch means including a pair of identical clutch members with one of said clutch members being fixed to the frame and the other of said clutch members being fixed to said connecting means, each of said clutch members having a plurality of circumferentially arranged teeth with the teeth of one clutch member being disposed in mating engagement with the teeth of the other clutch member to lock the frame with respect to said connecting means, said teeth having a pressure angle in the range of 10 to 45°, said clutch members being formed of a plastic material capable of being flexed as one of said clutch members is rotated with respect to the other of the clutch members, and means for preventing relative axial movement between the clutch members.

4. A mirror assembly, comprising a generally U-shaped frame member having a pair of generally horizontal legs, a mirror mounted between the legs of the frame, a connecting member associated with each leg of the frame for connecting said frame member to an outside object, and clutch means interconnecting the frame member and said connecting member, said clutch means including a pair of identical clutch elements having an odd number of circumferentially arranged meshing teeth formed of a material capable of being flexed as one of said clutch elements is rotated with respect to the other clutch elements, means for fixedly securing one of said clutch elements to said frame member, means for fixedly securing the other of said clutch elements to said connecting member, and means for preventing axial movement of the clutch elements, the meshing engagement of the teeth of said clutch elements serving to lock the frame member against movement and the flexible nature of said clutch elements permitting the frame member to be manually pivoted with respect to the connecting member to thereby vary the position of the mirror.

5. The structure of claim 4 in which the outer surface of each clutch element is provided with a projection disposed eccentrically with respect to the axis of the clutch element and said projection is received within an opening in the respective member to thereby prevent rotation of the clutch element with respect to said member.

6. The structure of claim 3 in which the clutch members are formed of an acetal resin.

7. A mirror assembly comprising a frame, a mirror mounted on the frame, connecting means for connecting the frame to an outside object, and clutch means interconnecting the frame and said connecting means, said clutch means including a pair of identical clutch members with one of said clutch members being fixed to the frame and the other of said clutch members being fixed to said connecting means, each of said clutch members having a generally concave inner surface facing the other clutch member and the inner surface of each clutch member being provided with a series of circumferentially arranged teeth disposed in meshing engagement with the teeth on the other of said clutch members, said clutch members being formed of a material capable of being flexed as one of said clutch members is being rotated with respect to the other of said clutch members, and means for preventing axial movement of the clutch members during relative rotation of said clutch members.

8. The structure of claim 7, in which the teeth are generally V-shaped and have a pressure angle in the range of 10 to 45°.

9. A mirror assembly, comprising a frame, a mirror mounted on the frame, connecting means for connecting the frame to an outside object, clutch means interconnecting the frame and the connecting means, said clutch means including a pair of identical clutch members with one of said clutch members being fixed to the frame and the other of the clutch members being fixed to said connecting means, said clutch members having meshing teeth capable of being deformed as one of said clutch members is rotated with respect to the other of said clutch members, and means for securing the clutch members against axial movement, said connecting means including a pair of mounting members, one of said mounting members having a generally concave surface with said surface being a portion of a sphere and the other of said mounting members having a generally convex surface with said convex surface being a portion of a sphere, said concave surface and convex surface being connected in mating complementary engagement.

References Cited
UNITED STATES PATENTS

| | | | |
|---|---|---|---|
| 2,277,755 | 3/1942 | Hansen | 248—479 |
| 2,488,316 | 11/1949 | Mosby | 248—289 |
| 2,860,546 | 11/1958 | Bolser | 248—477 |
| 2,911,177 | 11/1959 | West | 248—276 |
| 3,212,740 | 10/1965 | Greenberg | 248—245 |

ROY D. FRAZIER, *Primary Examiner.*

JOHN PETO, *Examiner.*

W. D. LOULAN, *Assistant Examiner.*